United States Patent [19]

Ohashi

[11] 3,773,702
[45] Nov. 20, 1973

[54] TWO-COMPONENT ADHESIVE COMPOSITION

[75] Inventor: Koichi Ohashi, Osaka, Japan

[73] Assignee: Sumitomo Chemical Company, Limited, Osaka-shi, Osaka-fu, Japan

[22] Filed: Feb. 9, 1971

[21] Appl. No.: 114,081

[30] Foreign Application Priority Data
Feb. 10, 1970 Japan.................................. 45/11601

[52] U.S. Cl... 260/31.2 N, 260/32.8 N, 260/33.6 A, 260/33.6 U, 260/33.8 U, 260/836, 260/837, 156/331
[51] Int. Cl..... C08f 45/28, C08f 45/30, C08f 45/38
[58] Field of Search.................. 260/32.8 A, 33.4 R, 260/33.6 A, 33.8 R, 836, 837, 47 EP, 29.1

[56] References Cited
UNITED STATES PATENTS

| | | | |
|---|---|---|---|
| 3,496,250 | 2/1970 | Czerwinski.......................... | 260/836 |
| 3,535,403 | 10/1970 | Holub.................................. | 260/837 |
| 3,562,215 | 2/1971 | Moore.................................. | 260/47 |
| 3,377,406 | 4/1968 | Newey................................. | 260/837 |
| 3,373,075 | 4/1968 | Fehete................................. | 161/185 |
| 3,631,127 | 12/1971 | Nomura............................... | 260/837 |

Primary Examiner—Allan Lieberman
Assistant Examiner—Richard Zaitlen
Attorney—Craig, Antonelli, Stewart & Hill

[57] ABSTRACT

A two-component adhesive composition consisting of a main composition comprising 50 to 80 parts by weight of at least one of divinyl compounds of the formula:

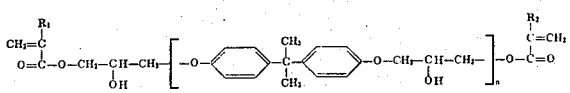

wherein $R_1$ and $R_2$ are each hydrogen, methyl or ethyl and n is an integer of 1 to 20, 0.05 to 10 parts by weight of at least one of organic peroxides, 0.5 to 15 parts by weight of acrylonitrile-butadiene-styrene terpolymer or acrylonitrile-butadiene rubber and 2 to 120 parts by weight of at least one of vinylic monomers (but each vinylic monomer not exceeding 40 parts by weight) and an accelerator composition comprising 0.01 to 10 parts by weight of at least one of thiourea derivatives, 0.01 to 10 parts by weight of $\alpha,\alpha'$-dipyridyl, 0.001 to 5 parts by weight of at least one of metal salts of organic or inorganic acids and 100 to 75 parts by weight of at least one of volatile organic solvents.

16 Claims, No Drawings

TWO-COMPONENT ADHESIVE COMPOSITION

The present invention relates to a two-component adhesive composition and a method for binding materials using the same.

Hitherto, there have been known various two-component adhesive compositions to be cured at room temperature. On their use, the components are required to weigh precisely and mixed well together prior to the binding operation. If and when the weighing is made unprecisely or the mixing is effected insufficiently, the adhesion strength may become inferior. Further, the adhesive composition after mixing has a pot life and, unless employed within a certain time, the viscosity will increase resulting in solidifying lastly. Moreover, most of the adhesive compositions take a considerable time for curing and the operation efficiency using them is not satisfactory. In order to improve the operation efficiency, heating or warming is occasionally effected. In such case, however, a special equipment is needed.

As the results of the extensive study, there has now been provided a two-component adhesive composition overcoming the said drawbacks as seen in the known ones. That is, the adhesivP composition of this invention can be quickly cured at room temperature, assures the satisfactory adhesion strength and is excellent in the stability on storage. It is particularly notable that, different from the known two-component adhesive compositions, the components in the adhesive composition of the invention are not required to mix prior to the use. Thus, the components are separately applied to the materials to be bound and the resulting materials are contacted each other at the applied portions, followed by curing to complete the adhesion. Because of such binding mode, it is possible to increase marked-ly the efficiency of the binding operation without any expensive equipment.

The two-component adhesive composition of the present invention consists of two component compositions, i.e. (1) a main composition and (2) an accelerator composition.

The main composition comprises 40 to 80 parts by weight of at least one of divinyl compounds of the formula:

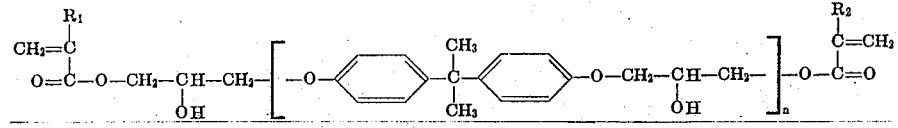

wherein $R_1$ and $R_2$ are each hydrogen, methyl or ethyl and $n$ is an integer of 1 to 20, 0.05 to 10 parts by weight of at least one of organic peroxides, 0.5 to 15 parts by weight of acrylonitrile-butadiene-styrene terpolymer or acrylonitrile-butadiene rubber and 2 to 120 parts by weight of at least one of vinylic monomers (each vinylic monomer not exceeding 40 parts by weight).

The above numerical limitations of the components are essential for providing the adhesive composition with favorable properties. Particularly preferred is the composition comprising 50 to 60 parts by weight of at least one of the divinyl compounds, 0.5 to 5 parts by weight of at least one of organice peroxides, 1 to 10 parts by weight of acrylonitrile-butadiene-styrene terpolymer or acrylonitrile-butadiene rubber and 10 to 120 parts by weight of at least one of vinylic monomers (each vinylic monomer not exceeding 40 parts by weight).

The main polymerizable component in the main composition is the divinyl compound, which is per se known [cf. U.S. Pat. No. 3,373,075; British Pat. No. 1,006,587].

The other polymerizable component is a vinylic monomer, of which examples are acrylic acid, vinyl acetate and $\beta$-hydroxyethyl methacrylate. The incorporation of such vinylic monomer is effective in increasing the curing rate and the primary adhesion strength.

The acrylonitrile-butadiene-styrene terpolymer and the acrylonitrile-butadiene rubber are well known as "ABS resin" and "NBR," respectively. Those are available as a formulating agent for improving the impact strength and the shear strength of the adhesion resulting from the application of the adhesive composition.

The organic peroxide is used as a polymerization initiator and may be normally a hydroperoxide such as cumene hydroperoxide, methylethylketone hydroperoxide, 2-methylbutene-1-hydroperoxide, 2,5-dimethylhexane dihydroperoxide and t-butyl hydroperoxide.

When desired, the main composition may include one or more additives such as coloring materials, plasticizers and propellants in addition to the said essential components.

The accelerator composition comprises 0.01 to 10 parts by weight of at least one of thiourea derivatives, 0.01 to 10 parts by weight of $\alpha,\alpha'$-dipyridyl, 0.001 to 5 parts by weight of at least one of metal salts of organic or inorganic acids and 100 to 75 parts by weight of at least one of volatile organic solvents.

Although the composition including the above components in the said numerical limitations is suitable, the more preferred is the one comprising 0.1 to 7 parts by weight of at least one of thiourea derivatives, 0.05 to 5 parts by weight of $\alpha,\alpha'$-dipyridyl, 0.001 to 3 parts by weight of at least one of metal salts of organic or inorganic acids and 100 to 75 parts by weight of at least one of volatile organic solvents.

Examples of the thiourea derivatives are trimethylthiourea, dipropionylthiourea, diacetylthiourea, tetramethylthiourea, etc. As the metal salts of organic or inorganic acids, there may be employed hydrochlorides, sulfates, nitrates, phosphates, aliphatic carboxylates and aromatic carboxylates of copper, cobalt, manganese, vanadium and chromium. Particularly preferred are lower alkanoic acid salts (e.g. acetate) and naphthenates of the said metals. These substances and $\alpha,\alpha'$-dipyridyl are available as the accelerators for the polymerization of the polymerizable monomer components in the main composition. Although each of them serves alone as an accelerator, only the combined use of at least one of the thiourea derivatives, $\alpha,\alpha'$-dipyridyl and at least one of the metal salts of organic or inorganic acids can assure the favorable instantaneous curing property and the excellent primary adhesion strength of the adhesive composition of the invention. Further, such combined use is advantageous, because the resultant accelerator composition is quite stable on storage for a long duration.

Examples of the volatile organic solvent used as the medium for the above accelerator substances are alcohols (e.g., methanol), ketones (e.g. acetone, methylethylketone), esters, halogenated hydrocarbons (e.g. methylene chloride, trichloroethylene, chlorofluoroethylene), etc.

When desired, one or more additives such as coloring materials, plasticizers and propellants may be incorporated into the accelerator composition besides the said essential components.

For binding materials by the use of the two-component adhesive composition of the invention, the main composition is applied to one of the materials to be bound and the accelerator composition to the other, both materials are then contacted closely at the applied portions and then the thus bound materials are cured for completion of the adhesion. The satisfactory adhesive state with the sufficient tensile strength and shear strength can be attained instantaneously by curing at room temperature. In the above binding operation, the application of the accelerator composition may be made previously so that the efficiency in the operation will be much elevated just like a conventional one-component adhesive composition.

The materials to be bound may be made of metals (e.g. iron, copper, nickel), plastics (e.g. polyvinyl chloride resin, polyacrylic resin, polyepoxy resin), woods, glass, pottery or the like.

The application can be effected in a conventional manner, e.g., painting, spraying, etc.

Practical and presently preferred embodiments of the present invention are illustratively shown in the following examples wherein parts and percent are by weight.

Example 1

In a flask equipped with an agitator, there are charged bisphenol A diglycidyl ether ("Epicoat 828" manufactured by Shell Petroleum Co., Ltd.) (190 parts) and methacrylic acid (80 parts), and triethylamine (5.8 parts) is added thereto at 50°C while stirring. After maintaining at 50°C for 5 hours, acrylic acid (20 parts) is added to the resulting mixture, and the reaction is carried out at the same temperature for 10 hours to give a liquid comprising the divinyl compound, of 5,000 to 10,000 cps in viscosity (hereinafter referred to as "liquid A") (290 parts). The liquid A (100 parts) is admixed with a vinylic monomer as shown in Table 1, and cumene hydroperoxide (3 parts) and NBR (6 parts) are added thereto to make a main composition. Separately, tetramethylthiourea (0.8 part), cobalt acetate (0.01 part), α,α'-dipyridyl (1.0 part) and cobalt naphthenate (0.05 part) are dissolved in acetone (100 parts) to make an accelerator composition.

On the top surface of a steel-made cylindrical piece of 1 cm² in section area, the accelerator composition is applied. After 30 seconds, the applied surface is closely contacted with the bottom surface of another steel-made cylindrical piece of 1 cm² in section area, the said bottom surface having been applied the main composition prior to the contacting. The tensile strength is measured 5 minutes, 15 minutes and 24 hours after the contacting.

The results are shown in Table 1, from which it is seen that the incorporation of the vinylic monomer into the main composition results in the increase of the tensile strength and the primary adhesion strength.

TABLE 1

| Vinylic monomer | | Tensile strength after contact (kg/cm²) | | |
|---|---|---|---|---|
| Kind | Amount added (part) | 5 min. | 15 min. | 24 hours |
| None | 0 | 38 | 120 | 235 |
| Vinyl acetate | 30 | 195 | 210 | 280 |
| Acrylic acid | 10 | 60 | 190 | 269 |
| β-Hydroxyethyl methacrylate | 30 | 189 | 260 | 327 |

Example 2

The liquid A obtained in Example 1 (100 parts) is admixed with cumene hydroperoxide (4 parts), NBR in an amount as shown in Table 2, acrylic acid (20 parts) and vinyl acetate (10 parts) to make a main composition.

Using the main composition and the accelerator composition as shown in Table 2, two steel-made cylindrical pieces are adhered each other in the same manner as in Example 1. The tensile strength is measured 30 seconds, 1 minute, 5 minutes and 24 hours after the adhering.

The results are shown in Table 2, from which it is seen that a considerable adhesion strength is attained in an extremely short time.

TABLE 2

| NBR content (part) | Accelerator composition | | Tensile strength after contact (kg/cm²) | | | |
|---|---|---|---|---|---|---|
| | Components | Content (part) | 30 sec. | 1 min. | 5 min. | 24 hrs. |
| 0 | α,α'-Dipyridyl | 1.2 | 25 | 74 | 180 | 389 |
| | Tetramethylthiourea | 0.9 | | | | |
| | Cobalt chloride | 0.01 | | | | |
| | Manganese acetate | 0.02 | | | | |
| | Acetone | 100 | | | | |
| 4 | α,α'-Dipyridyl | 1.2 | 12 | 40 | 162 | 378 |
| | Tetramethylthiourea | 0.9 | | | | |
| | Cobalt chloride | 0.01 | | | | |
| | Manganese acetate | 0.02 | | | | |
| | Acetone | 100 | | | | |
| 4 | α, α'-Dipyridyl | 0.05 | 10 | 43 | 172 | 407 |
| | N,N'-Diacetylthiourea | 2.9 | | | | |
| | Copper acetate | 0.006 | | | | |
| | Acetone | 100 | | | | |
| 4 | α,α'-Dipyridyl | 0.7 | 13 | 45 | 116 | 341 |
| | Trimethylthiourea | 2.3 | | | | |
| | Cobalt acetate | 0.002 | | | | |
| | Acetone | 100 | | | | |
| 4 | α,α'-Dipyridyl | 0.07 | 14 | 40 | 158 | 385 |
| | N,N'-Dipropionylthiourea | 2.83 | | | | |
| | Chromium naphthenate | 0.012 | | | | |
| | Acetone | 100 | | | | |
| 4 | α,α'-Dipyridyl | 0.05 | 28 | 80 | 185 | 350 |
| | Tetramethylthiourea | 0.1 | | | | |
| | Vanadium chloride | 0.01 | | | | |
| | Copper naphthenate | 0.01 | | | | |
| | A mixture of acetone and ethanol (8:2) | 100 | | | | |

Example 3

The liquid A obtained in Example 1 (100 parts) is admixed with cumene hydroperoxide (2.5 parts), acrylic acid (40 parts) and vinyl acetate (30 parts), and ABS resin or NBR in an amount as shown in Table 3 is added or not thereto to make a main composition. Separately, tetramethylthiourea (0.5 parts), $\alpha,\alpha'$-dipyridyl (1.0 part), cobalt naphthenate (0.05 part) and cobalt acetate (0.01 part) are dissolved in acetone (100 parts) to make an accelerator composition.

The accelerator composition is applied on the one surface of a steel-made rectangular strip of 2.54 cm in width, 12.0 cm in length and 5 mm in thickness, the application being made about 2 cm wide from the one edge. The main composition is applied on the one surface of another steel-made rectangular strip as above in the similar manner. The said strips are contacted each other at the applied portions (1.5 cm overlap). After 24 hours, the shear strength is measured.

The results are shown in Table 3, from which it is seen that the shear strength is markedly increased by the incorporation of ABS resin or NBR into the main composition.

TABLE 3

| Additive King | Amount added (part) | Shear strength (kg/cm²) |
|---|---|---|
| None | 0 | 90 |
| ABS resin | 8 | 380 |
|  | 15 | 256 |
|  | 30 | 230 |
| NBR | 8 | 290 |
|  | 15 | 298 |
|  | 30 | 280 |

Example 4

The liquid A obtained in Example 1 (100 parts) is admixed with acrylic acid (40 parts), vinyl acetate (30 parts) and NBR (7 parts), and cumene hydroperoxide (4 parts) is added thereto to make a main composition. Separately, tetramethyl-thiourea (0.0 part), $\alpha,\alpha'$-dipyridyl (0.08 part), cobalt acetate (0.01 part) and cobalt naphthenate (0.01 part) are dissolved in acetone (100 parts) to make an accelerator composition.

Using the main composition and the accelerator composition, the tensile strength and the shear strength with the lapse of time after adhesion are measured respectively as in Examples 1 and 3.

The results are shown in Table 4, from which it is seen that the tensile strength and the shear strength are quite excellent and can be attained rapidly after adhesion.

TABLE 4

| Time elapsed after adhesion | Tensile strength (kg/cm²) | Shear strength (kg/cm²) |
|---|---|---|
| 30 sec. | 32 |  |
| 1 min. | 98 |  |
| 2 min. | 119 |  |
| 3 min. | 185 |  |
| 5 min. | 226 | 115 |
| 24 hrs. | 322 | 290 |
| 48 hrs. | 360 |  |

The accelerator composition obtained as above is charged in a glass bottle and stored in a desiccator at 50°C for 1 month. Then, the tensile strength and the shear strength with the lapse of time after adhesion are measured in the same manner as above.

The results are shown in Table 5, from which it is seen that the accelerator composition is excellent in storage stability.

TABLE 5

| Time elapsed after adhesion | Tensile strength (kg/cm²) | Shear strength (kg/cm²) |
|---|---|---|
| 30 sec. | 36 |  |
| 5 min. | 214 | 108 |
| 24 hrs. | 340 | 272 |
| 48 hrs. | 353 | 285 |

For comparison, there are prepared accelerator compositions lacking one of tetramethylthiourea, $\alpha,\alpha'$-dipyridyl and cobalt acetate + cobalt naphthenate. Using each accelerator compositions, the tensile strength are measured in the same manner as above.

The results are shown in Table 6, from which it is seen that all these accelerator compositions can not realize the good adhesion so rapidly as the accelerator composition obtained in the above example does and are inferior to the latter in the stability on storage.

TABLE 6

| Components in accelerator composition (in acetone) | Tensile strength (before storage) (kg/cm²) | | Tensile strength (after storage at 50°C for 1 month (kg/cm²) | |
|---|---|---|---|---|
|  | 3 min. after adhesion | 24 hrs. after adhesion | 3 min. after adhesion | 24 hrs. after adhesion |
| Tetramethyl-thiourea $\alpha,\alpha'$-Dipyridyl | 34 | 332 | 38 | 319 |
| $\alpha,\alpha'$-Dipyridyl Cobalt acetate Cobalt naphthenate | 15 | 326 | 13 | 330 |
| Tetramethyl-thiourea Cobalt acetate Cobalt naphthenate | 130 | 281 | 85 | 277 |

What is claimed is:

1. A two-component adhesive composition consisting of a main composition comprising 40 to 80 parts by weight of at least one divinyl compound of the formula:

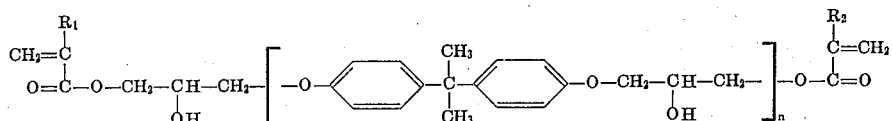

wherein $R_1$ and $R_2$ are each hydrogen, methyl or ethyl and n is an integer of 1 to 20, 0.05 to 10 parts by weight of at least one organic peroxide, 0.5 to 15 parts by weight of acrylo-nitrile-butadiene-styrene terpolymer or acrylonitrile-butadiene rubber and 2 to 120 parts by weight of at least one copolymerizable vinylic monomer other than said divinyl compound (but each vinylic monomer not exceeding 40 parts by weight) and an accelerator composition comprising 0.01 to 10 parts by weight of at least one thiourea derivative, 0.01 to 10 parts by weight of $\alpha,\alpha'$-dipyridyl, 0.001 to 5 parts by weight of at least one metal salt of organic or inorganic acids and 100 to 75 parts by weight of at least one volatile organic solvent.

2. The two-component adhesive composition according to claim 1, wherein the main composition comprises 50 to 60 parts by weight of at least one of the divinyl compounds, 0.5 to 5 parts by weight of at least one of the organic peroxides, 1 to 10 parts by weight of acrylonitrile-butadiene-styrene terpolymer or acrylonitrile-butadiene rubber and 10 to 120 parts by weight of at least one of the vinylic monomers (but each vinylic monomer not exceeding 40 parts by weight) and the accelerator composition comprises 0.1 to 7 parts by weight of at least one of the thiourea derivatives, 0.05 to 5 parts by weight of $\alpha,\alpha'$-dipyridyl, 0.001 to 3 parts by weight of at least one of the metal salts of organic or inorganic acids and 100 to 75 parts by weight of at least one of the volatile organic solvents.

3. The two-component adhesive composition according to claim 1, wherein at least one of the main composition and the accelerator composition comprises at least one coloring material, plasticizer and propellant.

4. The two-component adhesive composition according to claim 1, wherein the organic hydroperoxide is cumene hydroperoxide, methylethylketone hydroperoxide, 2-methylbutene-1-hydroperoxide, 2,5-dimethylhexane dihydroperoxide or t-butyl hydroperoxide.

5. The two-component adhesive composition according to claim 1, wherein the vinylic monomer is acrylic acid, vinyl acetate or $\beta$-hydroxyethyl methacrylate.

6. The two-component adhesive composition according to claim 1, wherein the thiourea derivative is trimethylthiourea, dipropionylthiourea, diacetylthiourea or tetramethylthiourea.

7. The two-component adhesive composition according to claim 1, wherein the metal salts of organic or inorganic acids are hydrochlorides, sulfates, nitrates, phosphates, aliphatic carboxylates or aromatic carboxylates of copper, cobalt, manganese, vanadium and chromium.

8. A method for adhering a material to another material which comprises applying a main composition comprising 40 to 80 parts by weight of at least one divinyl compound of the formula:

weight of acrylonitrile-butadiene-styrene terpolymer or acrylonitrile butadiene rubber and 2 to 120 parts by weight of at least one compolymerizable vinylic monomer other then said divinyl compound (but each vinylic monomer not exceeding 40 parts by weight) to the material and an accelerator composition comprising 0.01 to 10 parts by weight of at least one thiourea derivative, 0.01 to 10 parts by weight of $\alpha,\alpha'$-dipyridyl, 0.001 to 5 parts by weight of at least one metal salt of organic or inorganic acids and 100 to 75 parts by weight of at least one volatile organic solvent to the other material and contacting the resulting materials t0 each other.

9. The method according to claim 8, wherein the material to which the accelerator composition is applied, is dried and then contacted with the material to which the main composition has been applied.

10. The two-component adhesive composition according to claim 1, wherein the organic solvent is selected from the group consisting of alcohols, ketones, esters and halogenated hydrocarbons.

11. The method according to claim 8, wherein at least one of the main compositions and the accelerator composition comprises at least one pf coloring materials, plasticizers and propellants.

12. The method according to claim 8, wherein the organic hydroperoxide is cumene hydroperoxide, methylethylketone hydroperoxide, 2-methylbutene-1-hydroperoxide, 2,5-dimethylhexane dihydroproperoside or t-butyl hydroperoxide.

13. The method according to claim 8, wherein the vinylic monomer is acrylic acid, vinyl acetate or $\beta$-hydroxyethyl methacrylate.

14. The method according to claim 8, wherein the thioruea derivative is trimethylthiourea, dipropionylthiourea, diacetylthiourea or tetramethylthiourea.

15. The method according to claim 8, wherein the metal salts of organic or inorganic acids are hydrochlorides, sulfates, nitrates, phosphates, aliphatic carboxylates or aromatic carboxylates of copper, cobalt, manganese, vanadium and chromium.

16. The method according to claim 8, wherein the volatile organic solvent is selected from the group con-

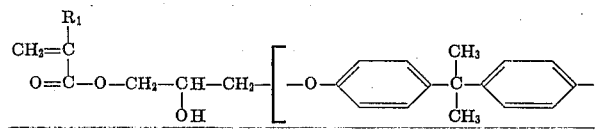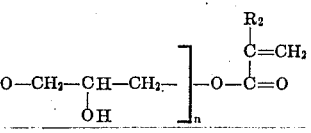

wherein $R_1$ and $R_2$ are each hydrogen, methyl or ethyl and n is an integer of 1 to 20, 0.05 to 10 parts by weight of at least one organic peroxide, 0.5 to 15 parts by sisting of alcohols, ketones, esters and halogenated hydrocarbons.

* * * * *